(12) United States Patent
Akedo et al.

(10) Patent No.: US 6,227,249 B1
(45) Date of Patent: May 8, 2001

(54) ABRASION RESISTANT HOSE

(75) Inventors: Youichi Akedo, Toyonaka; Tetsuya Inagake, Kakegawa; Hitoya Kodama, Kakegawa; Shoji Hattori, Kakegawa; Yoshiki Yoshitomi, Kakegawa; Masataka Morikawa, Kakegawa, all of (JP)

(73) Assignee: Tigers Polymer Corporation, Osaka (JP)

( * ) Notice: Subject to any disclaimer, the term of this patent is extended or adjusted under 35 U.S.C. 154(b) by 0 days.

(21) Appl. No.: 09/468,800

(22) Filed: Dec. 21, 1999

(30) Foreign Application Priority Data

Dec. 21, 1998 (JP) .................................................. 10-363154
Oct. 20, 1999 (JP) .................................................. 10-297578

(51) Int. Cl.$^7$ ........................................................ F16L 11/08
(52) U.S. Cl. ........................... 138/137; 138/141; 138/174; 138/132; 138/153
(58) Field of Search .................................. 138/137, 140, 138/141, 172, 174, 129, 132, DIG. 7, 144, 153

(56) References Cited

U.S. PATENT DOCUMENTS

| 3,773,449 | * | 11/1973 | Hager | 425/114 |
|---|---|---|---|---|
| 4,098,298 | * | 7/1978 | Vohrer | 138/122 |
| 4,140,154 | * | 2/1979 | Kanao | 138/132 |
| 4,210,739 | * | 7/1980 | Gallagher et al. | 526/325 |
| 4,587,145 | * | 5/1986 | Kanao | 138/129 X |
| 4,778,455 | * | 10/1988 | Kousai et al. | 604/270 |
| 4,844,578 | * | 7/1989 | Pierini et al. | 350/96.34 |
| 5,918,642 | * | 7/1999 | Akedo et al. | 138/132 |

FOREIGN PATENT DOCUMENTS 11141753    5/1999   (JP) .

* cited by examiner

Primary Examiner—Patrick Brinson
(74) Attorney, Agent, or Firm—Pillsbury Winthrop LLP

(57) ABSTRACT

The abrasion resistant hose of the present invention comprises an inner layer mainly formed with a thermoplastic polyurethane resin, an outer protective layer comprising a soft vinyl chloride resin united with the inner layer by thermal-fusion, and a spiral reinforcement comprising a hard synthetic resin buried in or attached to the outer protective layer. The inner layer is formed with a thermoplastic polyurethane resin containing substantially no migratory plasticizer or an internally-plasticized thermoplastic polyurethane resin (i.e., a thermoplastic polyurethane resin which is not externally-plasticized with a migratory plasticizer). The outer protective layer is formed with a soft vinyl chloride resin containing substantially no migratory plasticizer, united with the inner layer by fusion. An intermediate layer comprising a soft vinyl chloride resin containing no migratory plasticizer may be interposed between the inner layer and the outer protective layer. According to the present invention, there is provided a pressure-proof synthetic resin hose featuring excellent abrasion resistance, bending durability, and others, which does not suffer the contraction phenomenon caused by the bleed or migration of a conventional plasticizer.

11 Claims, 2 Drawing Sheets

1

1

F I G. 3
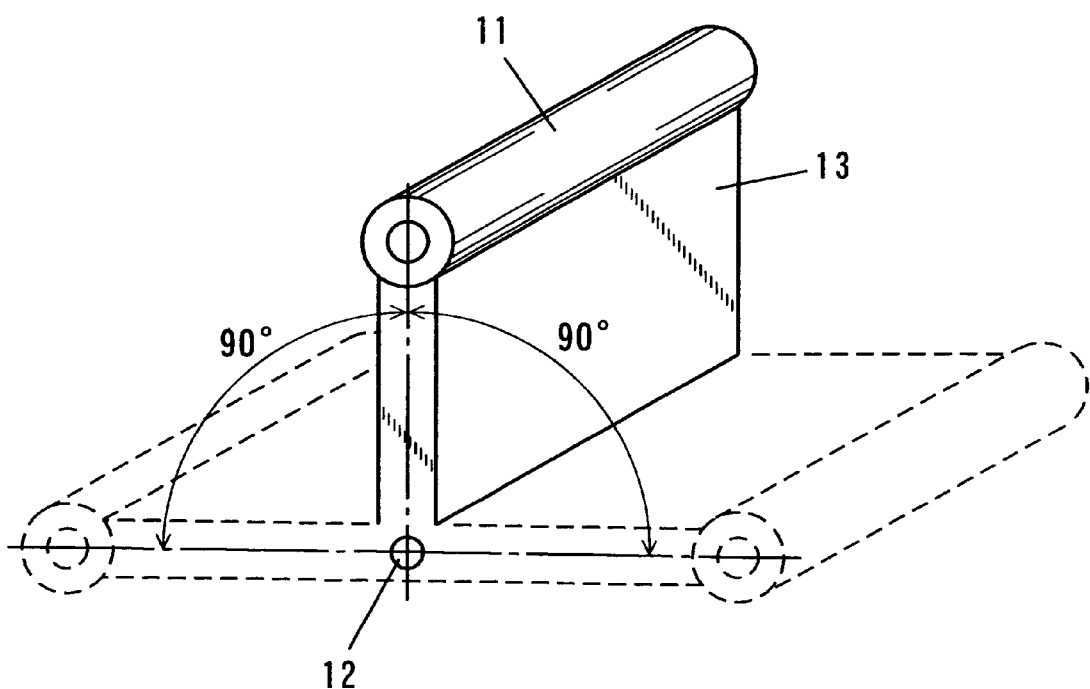

ABRASION RESISTANT HOSE

FIELD OF THE INVENTION

The present invention relates to an abrasion resistant hose in which an inner layer of a hose wall comprising a thermoplastic polyurethane resin, particularly a polyester-series thermoplastic polyurethane resin.

BACKGROUND OF THE INVENTION

Highly pressure-proof abrasion resistant synthetic resin hoses have been used for, e.g., conveyance or transport of powdery or granular particles, and suction and compression-transport of iron powder, sand, ballast. As such synthetic resin hose, Japanese Patent Application Laid-Open No. 141753/1999 (JP-A-11-141753) discloses an abrasion resistant hose comprising an inner layer mainly formed with a polyester-series thermoplastic polyurethane resin, an outer protective layer (hose wall) comprising a soft vinyl chloride resin united with the inner layer by thermal-fusion, and a spiral reinforcement comprising a hard vinyl chloride resin buried in or attached to the outer protective layer.

For improving the moldability or processability of thermoplastic polyurethane resins by making them softer, the inner layer of the above-described abrasion resistant hose is generally formed with an externally-plasticized polyester-series thermoplastic polyurethane resin comprising a polyester-series thermoplastic polyurethane resin and a conventional plasticizer (e.g., a phthalate-series plasticizer) (e.g., E670MNAT manufactured by Nippon Miractran, Co. Ltd.); C70A10W manufactured by Takeda Badische Urethane Industrird, Ltd.).

However, when a powdery substance (e.g., powders or particles capable of absorbing or capturing plasticizer, such as slaked lime or active carbon) are passed through the inside of the abrasion resistant hose, there occurs a phenomenon that the plasticizer (e.g., a phthalate-series plasticizer) added to the thermoplastic polyurethane resin bleeds out from the inner layer to the outer and drained off as the powdery substance is being conveyed because the migration of the platicizer is large. Accompanying or being indifferent to such phenomenon, the conventional plasticizer of large migration, such as a phthalate-series plasticizer [e.g., dioctyl phthalate (DOP)], contained in the soft vinyl chloride resin forming the outer layer migrates to the adjoining inner layer. Therefore, the volume or size of the hose is reduced and the hose contracts, resulting in the hose which is now shorter than as it was.

SUMMARY OF THE INVENTION

Thus, an object of the present invention is to provide an abrasion resistant hose effectively prevented from the bleed migration of plasticizers added to an inner layer and an outer layer.

Another object of the present invention is to provide a synthetic resin pressure-proof hose which is excellent in abrasion resistance, bending resistance, and other characteristics and free from the contraction phenomenon.

The present invention provides the following abrasion resistant hoses to solve the problems described above.

(1) An abrasion resistant hose comprising an inner layer mainly formed with a thermoplastic polyurethane resin, an outer protective layer comprising a soft vinyl chloride resin united with the inner layer by thermal-fusion, and a spiral reinforcement comprising a hard synthetic resin buried in or attached to the outer protective layer, wherein the inner layer is formed with the thermoplastic polyurethane resin containing substantially no migratory plasticizer or an internally-plasticized thermoplastic polyurethane resin (i.e., a thermoplastic polyurethane resin which is not externally-plasticized by a migratory plasticizer), and the outer protective layer is formed with a soft vinyl chloride substantially free from migratory plasticizer.

(2) An abrasion resistant hose comprising an inner layer mainly formed with a thermoplastic polyurethane resin, an outer protective layer comprising a soft vinyl chloride resin united with the inner layer by thermal-fusion, and a spiral reinforcement comprising a hard synthetic resin buried in or attached to the outer protective layer, wherein the inner layer is formed with the thermoplastic resin containing substantially no migratory plasticizer or an internally-plasticized thermoplastic polyurethane resin (i.e., a thermoplastic polyurethane resin which is not externally-plasticized by a migratory plasticizer), and an intermediate layer comprising a soft vinyl chloride resin containing substantially no migratory plasticizer interposed between and united with both the inner layer and the outer protective layer by fusion.

(3) The inner layer may be formed with a polyester-series thermoplastic polyurethane resin containing a non-migration plasticizer.

Polyester-series thermoplastic polyurethane resins usable for the formation of the inner layer of the hose wall are classified by the species of a polyol material as a soft segment for polyurethane and refer to thermoplastic polyurethane resins (TPU) of the type employing a polyester polyol as a polyol component. Thermoplastic polyurethane resins include those blended with a thermoplastic resin(s) such as polyvinyl chloride, polyester, polyamide. with the proviso that the properties of the thermoplastic polyurethane resins are not largely affected.

The thermoplastic polyurethane resin (particularly, a polyester-series thermoplastic polyurethane resin) is internally plasticized by selecting a polyol as a soft segment capable of softening the resin more (particularly, a polyester polyol material), and contains substantially no migratory plasticizer (e.g., a phthalate-series plasticizer) as an additive. Moreover, even in the case where the polyester-series thermoplastic polyurethane resin is externally-plasticized, a non-migration plasticizer is used. Therefore, the polyester-series thermoplastic polyurethane resin shows multiply superior performance in its abrasion resistance than that of a soft vinyl chloride resin, and gives excellent mechanical strength, flexibility, elasticity and others to the hose. Furthermore, the polyester-series thermoplastic polyurethane resin is excellent in adhesion with a vinyl chloride resin and has an advantage of being capable of directly fusing with the outer protective layer comprising a soft vinyl chloride without the aid of an adhesive intermediate resin material.

The phrase "containing no plasticizer for externally-plasticization" refers to both cases where the resin does not contain a plasticizer at all and where the resin contains a plasticizer in such a small amount that nothing will be adversely affected even if the plasticizer bleeds out.

On the other hand, the soft vinyl chloride resin forming the outer protective layer or the intermediate layer contains substantially no migratory plasticizer. The phrase "containing substantially no migratory plasticizer" means (1) a plasticizer having excellent non-migration property, such as a polyester-series plasticizer, is used instead of, e.g., the above-mentioned phthlate-series plasticizer which has been used widely and is of large migration; (2) internally-plasticization by copolymerizing vinyl chloride with a soft monomer; and (3) plasticization by admixing a modifying polymer to a vinyl chloride resin to form a polymer blend.

As was described above, the contraction of the hose can be effectively prevented by the combination of the polyester-series thermoplastic polyurethane resin which is not externally-plasticized with a migratory plasticizer and the soft vinyl chloride resin containing no migratory plasticizer, because the inner layer does not contain a plasticizer to bleed out as well as the outer layer contains no plasticizer to migrate.

Incidentally, even with the combination of the inner layer formed with, instead of the internally-plasticized polyester-series thermoplastic polyurethane resin, a polyester-series thermoplastic polyurethane resin to which a non-migration plasticizer such as a polyester-series plasticizer is added, and the outer layer comprising a migratory plasticizer-free soft vinyl chloride resin, bleed or migration of the plasticizer never occurs and the hose is effectively prevented from contracting.

BRIEF DESCRIPTION OF THE DRAWINGS

FIG. 3 is a view illustrating a testing device.

DETAILED DESCRIPTION OF THE INVENTION

Hereinafter, the embodiments of the abrasion resistant hose of the present invention will be described with reference to the figures.

Figure 1:
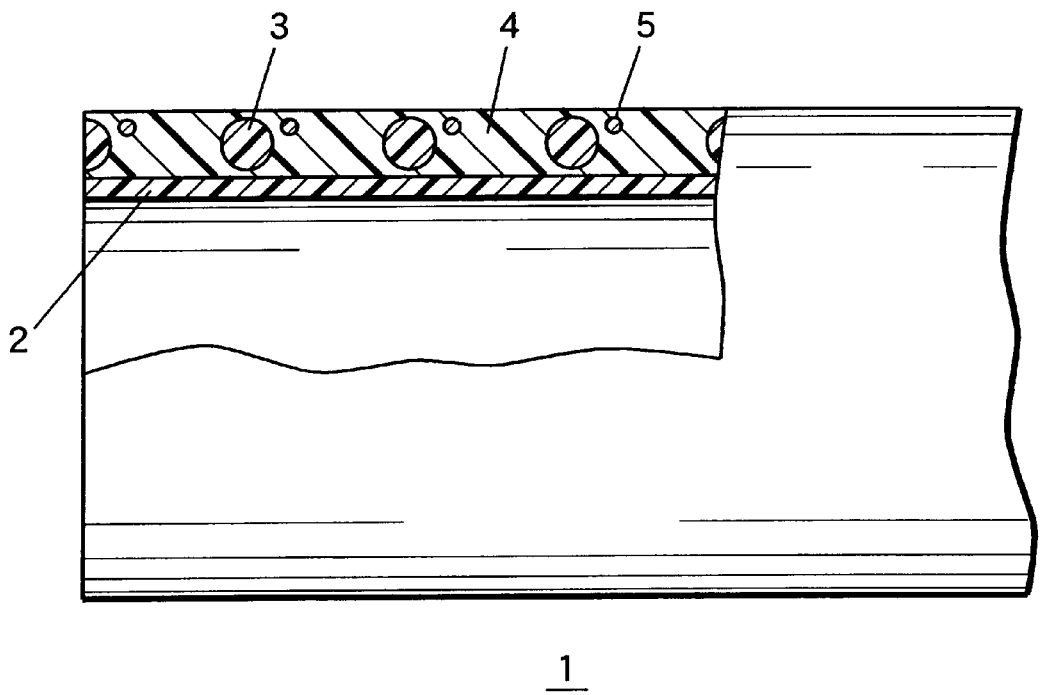
FIG. 1 is a partial cross-sectional view illustrating an embodiment of the present invention.

FIG. 1 is a partial cross-sectional view illustrating a hose, in which a hose 1 comprises an inner layer 2, an outer protective layer 4 adhered to the inner layer 2, and a hard spiral reinforcement 3 for retaining the shape of the hose, buried in or attached to the outer protective layer 4. The inner layer 2 and the outer layer 4 constitute the hose wall. The hard spiral reinforcement 3 is embedded in the outer protective layer 4 to form an outer protective reinforced layer. The inner layer 2 is mainly formed with a polyester-series thermoplastic polyurethane resin, the hard spiral reinforcement 3 is formed with a hard vinyl chloride resin, and the outer protective layer 4 is formed with a soft vinyl chloride resin. The inner layer 2, the hard spiral reinforcement 3, and the outer protective layer 4 are united together by thermal-fusion, and an earth cable 5 of a copper wire is buried or embedded in the outer protective layer 4.

The polyester-series thermoplastic polyurethane resin forming the inner layer 2 is softened without adding a conventional plasticizer such as a phthalate-series plasticizer. As such thermoplastic polyurethane resin, e.g., E660MZAA by Nippon Miractran, Co., Ltd. and Elastollan (tradename) C70A, C80A and ET680 by Takeda Badische Urethane Industries, Ltd. are available.

Furthermore, to the soft vinyl chloride resin forming the outer protective layer 4 is added a non-migration plasticizer, such as a macromolecule plasticizer, for example, a polyester-series plasticizer (weight-average molecular weight: 600 to 8,000) having small absolute migration amount.

The hose 1 can be fabricated by spirally winding a soft tape for forming the inner layer 2 and a soft tape for forming the outer protective layer 4, and fusing the adjoining side edges of the tapes. To be more concrete, the hose 1 is formed by spirally winding a transparent tape comprising a soft vinyl chloride resin extruded out from the extruder with the reinforcement 3 and the earth cable 5 embedded therein, fusing the adjoining side edges to form the outer protective layer 4 while spirally winding a transparent, soft, polyester-series thermoplastic polyurethane resin tape extruded from the extruder and fusing the adjoining side edges to form the inner layer 2 inside the outer protective layer 4, and uniting the inner layer 2 with the outer protective layer 4 by fusion.

Since the hose is entirely formed with transparent resins, objects passing therethrough are observable and shows excellent static prevention effect due to the earth cable embedded in the hose. Incidentally, the reinforcement 3 may not be buried in the outer protective layer 4 but may be attached to the outer surface of the outer protective layer 4 with part of the reinforcement 3 exposed.

Figure 2:
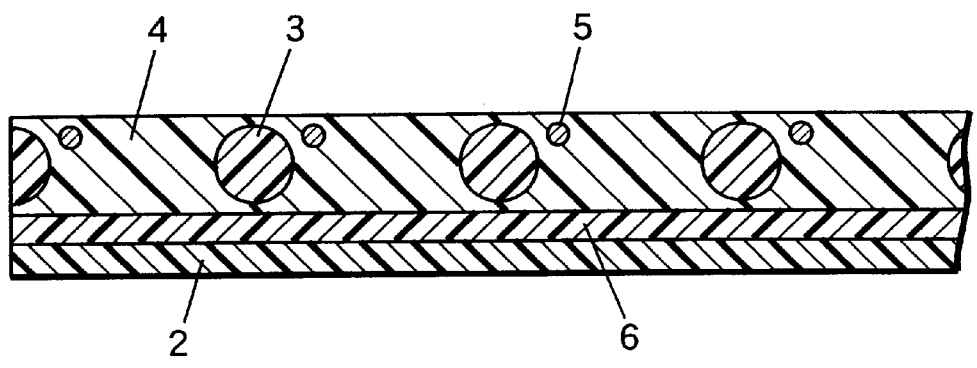
FIG. 2 is a cross-sectional view illustrating another embodiment of the present invention.

FIG. 2 is a schematic cross-sectional view illustrating another embodiment of the hose, in which an intermediate layer 6 is interposed between the inner layer 2 and the outer protective layer 4. The intermediate layer 6 is formed by spirally winding a soft vinyl chloride tape and fusing the adjoining side edges to one another. As in the case with the soft vinyl chloride resin forming the outer protective reinforced layer 4 in FIG. 1, to the soft vinyl chloride resin forming the intermediate layer 6 is added a non-migration polyester-series plasticizer. In the hose having such structure, a standard plasticizer such as DOP may be added to the soft vinyl chloride resin forming the outer protective reinforced layer 4.

As the thermoplastic polyurethane resin, there may be exemplified polyester-series polyurethane resins employing a polyester diol; polyether-series polyurethane resins employing a polyether diol (e.g., polyether diols having an oxy-$C_{2-4}$alkylene unit such as polyoxytetramethylene glycol); and polycarbonate-series polyurethane resins employing a polycarbonate diol. Preferred as the thermoplastic polyurethane resin is a polyester-series thermoplastic polyurethane resin.

The polyester-series thermoplastic polyurethane resin can be obtained by reacting a polyester polyol component, a polyisocyanate component and, optionally, a chain extending agent. The polyester polyol component can be obtained not only by (1) reacting a polyol component containing at least a diol with a polycarboxylic acid component containing at least a dicarboxylic acid or a reactive derivative thereof (e.g. lower alkyl esters, acid anhydrides) but also by (2)

reacting a lactone singly or (3) a lactone and the polyol component and/or the polycarboxylic acid component.

Diols include at least aliphatic diols, such as alkylene glycols ($C_{2-6}$alkylene glycols such as ethylene glycol, 1,3-trimethylene glycol, propylene glycol, butane diol, hexane diol, and neopentyl glycol); and polyoxyalkylene glycols (polyoxy$C_{2-4}$alkylene glycols such as diethylene glycol, triethylene glycol, dipropylene glycol, tripropylene glycol, polyethylene glycol, and polyoxytetramethylene glycol). Aliphatic diols can be used either independently or in combination. The polyol component may comprise, in addition to an aliphatic diol of those listed above, an alicylic diol (e.g., ethoxylated hydroganeted bisphenol A), an aromatic diol (e.g., ethoxylated bisphenol A), or a polyol (e.g., triols or tetraols such as glycerol and trimethylolpropane).

The polycarboxylic acid component comprises at least an aliphatic dicarboxylic acid or a derivative thereof, such as an aliphatic $C_{4-20}$dicarboxylic acid such as succinic acid, adipic acid, azelaic acid, and sebacic acid. These aliphatic dicarboxylic acids can be used either independently or in combination. The polycarboxylic acid component may comprise, in addition to an aliphatic dicarboxylic acid or a derivative thereof, an alicylic dicarboxylic acid (e.g., tetrahydrophthalic acid anhydride, hexahydrophthalic acid anhydride) or an aromatic dicarboxylic acid (e.g., phthalic acid, isophthalic acid, terephthalic acid). The polycarboxylic acid component may comprise a polycarboxylic acid, such as trimellitic acid anhydride and pyromellitic acid anhydride.

As the lactone, there may be exemplified $C_{4-12}$lactones such as butyrolactone, balerolactone, caprolactone, and laurolactone.

Preferred polyester polyols include polyester diols formed by esterifying a diol component comprising at least one diol selected from a $C_{2-6}$alkylene glycol (particularly, a $C_{2-4}$alkylene glycol such as ethylene glycol and butane diol) and a polyoxy$C_{2-4}$alkylene glycol [particularly, an oxyethylene glycol expressed by the formula $HO(CH_2CH_2O)_nH$ (wherein n is an integer of 2 to 4)] and a dicarboxylic acid component comprising at least one dicarboxylic acid selected from an aliphatic $C_{6-10}$dicarboxylic acid (particularly, adipic acid, azelaic acid, sebacic acid); and polyester diols obtained by reacting such diol component and/or dicarboxylic acid component with a $C_{4-12}$lactone.

The weight molecular weight of the polyester diol is, e.g., 500 to 10,000, preferably about 700 to 5,000, and more preferably about 1,000 to 3,000.

The polyisocyanate component comprises at least a diisocyanate, such as an aromatic diisocyanate (e.g., phenylene diisocyanate, tolylene diisocyanate TDI, diphenylmethane-4,4'-diisocyanate MDI), an aromatic aliphatic diisocyanate (e.g., xylylene diisocyanate XDI), an alicyclic diisocyanate (e.g., isophorone diisocyanate IPDI, hydrogenated MDI), or an aliphatic diisocyanate (e.g., 1,6-hexamethylene diisocyanate HDI, lysine diisocyanate LDI). The polyisocyanate component may be used either independently or in combination. The polyisocyanate component may be an adduct and, if necessary, used together with a polyisocyanate such as triphenylmethane triisocyanate.

As the chain extending agent, a short chain diol (e.g., a straight- or branched chain $C_{2-6}$alkylene glycol) or a diamine (e.g., an alkylene diamine) can be used.

The internally-plasticization of the polyurethane resin can be effected by introducing a soft segment thereto. A soft diol component preferable as the soft segment is an aliphatic poly(ether ester)diol having an ether unit and an ester unit, and the aliphatic poly(ether ester)diol comprises an oxyethylene glycol represented by the following formula:

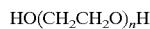

$$HO(CH_2CH_2O)_nH$$

wherein n in an integer of 2 to 4 (i.e., diethylene glycol, triethylene glycol, tetraethylene glycol) together with a $C_{2-6}$alkylene glycol (particularly, a $C_{2-4}$alkylene glycol). In the diol component, the proportion of the oxyethylene glycol expressed by the above formula is about 1 to 70 mol %, preferably about 5 to 50 mol %, and more preferably about 10 to 30 mol %. The internally-plasticized polyurethane resin may be a polyurethane elastomer.

For externally plasticizing the polyurethane resin, non-migration plasticizer is used. Incidentally, when a non-migration plasticizer is used, the polyurethane resin does not need to be internally-plasticized and, if necessary, an internally-plasticized polyurethane resin may be used.

As the non-migration plasticizer, there may be exemplified a polyester-series plasticizer. The polyester-series plasticizer usually comprises a homo- or copolyester formed by reacting a $C_{2-10}$alkylene glycol of those listed above (particularly, a $C_{2-6}$alkylene glycol such as ethylene glycol, butane diol, and hexane diol) with an aliphatic $C_{4-20}$dicaroboxylic acid (particularly, a $C_{6-10}$dicarboxylic acid such as adipic acid, azelaic acid, sebacic acid); or a copolyester of a $C_{2-10}$alkylene glycol and/or a $C_{6-10}$dicarboxylic acid of those listed above with a lactone. If need be, in addition to such component(s), the plasticizer may be a polyester using a polyoxyalkylene glycol and/or an aromatic dicarboxylic acid.

The weight average molecular weight of the polyester-series plasticizer may usually be about 600 to 8,000, preferably about 700 to 7,000, and more preferably about 800 to 5,000.

The content of the polyester-series plasticizer can be selected from the range of, e.g., about 1 to 100 parts by weight, preferably about 5 to 50 parts by weight, and more preferably about 5 to 30 parts by weight (e.g., 10 to 30 parts by weight) relative to 100 parts by weight of the polyurethane resin.

The internally-plasticization of the vinyl chloride resin can be effected by, as was described above, copolymerizing vinyl chloride with a soft monomer. As the soft monomer, there may be mentioned, for example, higher alkyl vinyl derivatives (e.g., vinyl ethers of $C_{8-20}$ higher alcohols); olefines (e.g., ethylene, butene); vinyl esters (e.g., vinyl acetate, vinyl propionate or vinyl esters of $C_{8-20}$ higher aliphatic acids); and acrylic acid $C_{2-10}$alkyl esters (e.g., ethyl acrylate, butyl acrylate, hexyl acrylate, 2-ethylhexyl acrylate, and lauryl acrylate). These soft monomers can be used either independently or in combination. The amount of the soft monomer can be selected from the range of, e.g., about 1 to 50 mol %, preferably about 3 to 30 mol %.

The internally-plasticized vinyl chloride resin may be a copolymer of a soft resin (e.g., ethylene-vinyl acetate copolymers, polyurethane resins) onto which vinyl chloride is grafted.

For softening the vinyl chloride resin by polymer-blending, a variety of soft resins can be used, such as ethylene-vinyl acetate copolymer, copolymers of soft resins (e.g., ethylene-vinyl acetate copolymer, polyurethane resins) on which vinyl chloride is grafted, and rubber graft copolymers (e.g., polybutadiene-styrene graft copolymer (HIPS), acrylonitrile-butadiene-styrene copolymer (ABS resin), methyl methacrylate-butadiene-styrene copolymer (MBS resin)). These soft resins can be used either independently or in combination. The amount of the soft resin used is, relative to 100 parts by weight of the vinyl chloride resin, about 5 to 25 parts by weight, preferably about 5 to 15 parts by weight, and more preferably about 5 to 10 parts by weight.

For the externally-plasticization of the vinyl chloride resin, a non-migration plasticizer similar to those listed above is used. The amount of the plasticizer can be selected from within the range of, e.g., about 20 to 120 parts by weight, preferably about 30 to 100 parts by weight, and more preferably about 40 to 100 parts by weight, relative to 100 parts by weight of the vinyl chloride resin.

The hard spiral reinforcement can be formed with a hard resin (e.g., hard vinyl chloride resins, polycarbonate resins, polyamide resins), a metal wire (e.g., steel wire, piano wire, stainless steel wire), or the like. The hard spiral reinforcement may be covered with a resin. The hard spiral reinforcement is spirally wound at a suitable pitch (e.g., single pitch, double pitch, triple pitch).

If needed, a variety of additives may be added to the inner layer, the outer protective layer, or to the intermediate layer, such as stabilizers (e.g., antioxidants, ultraviolet ray absorbers, heat stabilizers, chlorine-scavengers), antistatic agents, flame retardants, lubricants, colorants, and fillers.

EXAMPLES

Hereinafter, the results of a comparison test conducted to evaluate the contraction-prevention effect in a lengthwise direction of each hose.

Example

As a hose having a structure illustrated in FIG. 1, there was produced a hose (diameter: 75φ, length: 400 mm) composed of a spiral reinforcement comprising a hard vinyl chloride resin, an outer protective layer 4 comprising a soft vinyl chloride resin formed by adding 98 parts by weight of a polyester-series plasticizer to 100 parts by weight of a vinyl chloride resin, and the inner layer 3 formed with a polyester-series thermoplastic polyurethane resin which is free from a conventional plasticizer and internally-plasticized by using a polyester diol.

Comparative Example

As a hose having the same structure as that shown in FIG. 1, there was produced a hose (diameter: 75φ, length: 400 mm) composed of an outer protective layer comprising a soft vinyl chloride resin formed by adding 90 parts by weight of a phthalate-series plasticizer (DOP) to 100 parts by weight of a vinyl chloride resin and an inner layer formed with a polyester-series thermoplastic polyurethane resin to which 45 parts by weight of a DOP is added relative to 100 parts by weight of the polyester-series thermoplastic polyurethane resin.

Each specimen hose was filled with slaked lime in an amount of one third of the hose by volume and attached to an apparatus shown in FIG. 3. This apparatus is rotatable within the range of 180° around the axis 12, equipped with a support 13 to which the hose 11 can be attached. The hose attached to the apparatus was reciprocally rotated 180° at a rate of twenty times per minute at 30° C. Measurements were made on each hose to determine a change in length every 72 hours. The rates of hose contraction obtained are shown in FIG. 1.

TABLE 1

| Time (hr) | Example | Comp. Example |
|---|---|---|
| 0 | 0% | 0% |
| 72 | 0% | 0.3% |
| 144 | 0% | 0.6% |
| 216 | 0% | 0.8% |
| 288 | 0% | 0.8% |
| 360 | 0% | 0.8% |

As obvious from Example and Comparative Example and the comparative embodiment, the abrasion resistant hose according to the present invention is significantly improved in its hose-length contraction rate and hardly suffers the contraction phenomenon.

As can be understood from the above, according to the present invention, such excellent properties as abrasion resistance or flexibility that polyester-series thermoplastic polyurethane resins have are retained, and contraction of a hose caused by a plasticizer which begins to bleed out or migrate upon contact with what is being passed through the hose is prevented. Therefore, the abrasion resistant hose of the present invention is expected to show excellent durability when used as a synthetic resin-made flexible hose for slaked lime conveyance at a waste product (garbage) incineration facility.

What is claimed is:

1. An abrasion resistant hose comprising an inner layer mainly formed with a thermoplastic polyurethane resin, an outer protective layer comprising a soft vinyl chloride united with the inner layer, and a spiral reinforcement comprising a hard synthetic resin buried in or attached to the outer protective layer, wherein the inner layer comprises a thermoplastic polyurethane resin being substantially free of a migratory plasticizer or an internally-plasticized thermoplastic polyurethane resin, and the outer protective layer comprises a soft vinyl chloride resin being substantially free of a migratory plasticizer.

2. An abrasion resistant hose according to claim 1, wherein the inner layer comprises a polyester-series thermoplastic polyurethane resin.

3. An abrasion resistant hose according to claim 1, wherein the inner layer comprises an internally-plasticized polyester-series thermoplastic polyurethane resin having a soft segment.

4. An abrasion resistant hose according to claim 1, wherein the thermoplastic polyurethane resin is a resin obtained by reacting a polyester polyol component, a polyisocyanate component and, optionally, a chain extending agent, and the polyester polyol component is (1) a polyester diol formed by esterifying a diol component comprising at least one member selected from the group consisting a $C_{2-4}$alkylene glycol and a polyoxy$C_{2-4}$alkylene glycol, and a dicarboxylic acid component comprising at least one member selected from an aliphatic $C_{6-10}$dicarboxylic acid, (2) a polyester diol formed by the ring-opening polymerization of a $C_{4-12}$ lactone, or (3) a polyester diol formed by reacting at least one member selected from the diol component and the dicarboxylic acid component with a $C_{4-12}$lactone.

5. An abrasion resistant hose according to claim 4, wherein the weight average molecular weight of the polyester diol is 500 to 10,000.

6. An abrasion resistant hose according to claim 3, wherein the internally-plasticized polyurethane resin is a resin formed by reacting a polyester polyol component, a polyisocyanate component and, optionally, a chain extending agent, wherein the polyester polyol component is an aliphatic poly(ether ester)diol and a diol for the aliphatic poly(ether ester)diol comprises a combination of an oxyethylene glycol represented by the following formula:

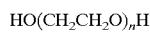

wherein n is an integer of 2 to 4 and a $C_{2-6}$alkylene glycol.

7. An abrasion resistant hose according to claim 1, wherein the outer protective layer comprises a soft vinyl chloride resin containing a non-migration plasticizer.

8. An abrasion resistant hose according to claim 1, wherein at least one of said inner layer and outer protective layer is a non-migration plasticizer which is a polyester-series plasticizer.

9. An abrasion resistant hose according to claim 8, wherein the weight-average molecular weight of the non-migration plasticizer is 600 to 8,000.

10. An abrasion resistant hose comprising an inner layer mainly formed with a thermoplastic polyurethane resin, an outer protective layer comprising a soft vinyl chloride resin united with the inner layer by thermal-fusion, and a spiral reinforcement comprising a hard synthetic resin buried in or attached to the outer protective layer, wherein the inner layer comprises a thermoplastic polyurethane resin being substantially free of a migratory plasticizer or an internally-plasticized thermoplastic polyurethane resin, and an intermediate layer comprising a soft vinyl chloride resin being substantially free of a migratory plasticizer is interposed between and united with the inner layer and the outer protective layer by thermal-fusion.

11. An abrasion resistant hose according to claim 1, wherein the outer protective layer comprises a soft vinyl chloride resin containing a non-migration plasticizer comprising a polyester-series plasticizer.

* * * * *